United States Patent [19]

Jacquet

[11] Patent Number: 4,482,011
[45] Date of Patent: Nov. 13, 1984

[54] CASE FOR HOUSING A HEAT EXCHANGER, IN PARTICULAR FOR A HEATER INSTALLATION FOR THE PASSENGER SPACE OF A MOTOR VEHICLE

[75] Inventor: Maurice Jacquet, Maurepas, France
[73] Assignee: Valeo, Paris, France
[21] Appl. No.: 374,793
[22] Filed: May 4, 1982
[30] Foreign Application Priority Data
  May 11, 1981 [FR] France .................. 81 09360
[51] Int. Cl.³ .............................. F28F 9/00
[52] U.S. Cl. ...................... 165/67; 165/78; 165/149
[58] Field of Search ............. 165/149, 78, 67, 69, 165/72-76

[56] References Cited
U.S. PATENT DOCUMENTS 3,858,291  1/1975  Perpall ..................... 165/69 X
4,328,859  5/1982  Bouvot ..................... 165/78
4,410,034 10/1983  Bernhardt et al. ........... 165/80 E Primary Examiner—Sheldon J. Richter
Attorney, Agent, or Firm—Dennison, Meserole, Pollack & Scheiner

[57] ABSTRACT

The case has a housing (15) with an open end from whose annular edge (16) there depends an annular projection (20) constituting an elastically deformable lip which presses against the tube plate (13) of the heat exchanger, thereby sealing the housing around the tube plate.

12 Claims, 10 Drawing Figures

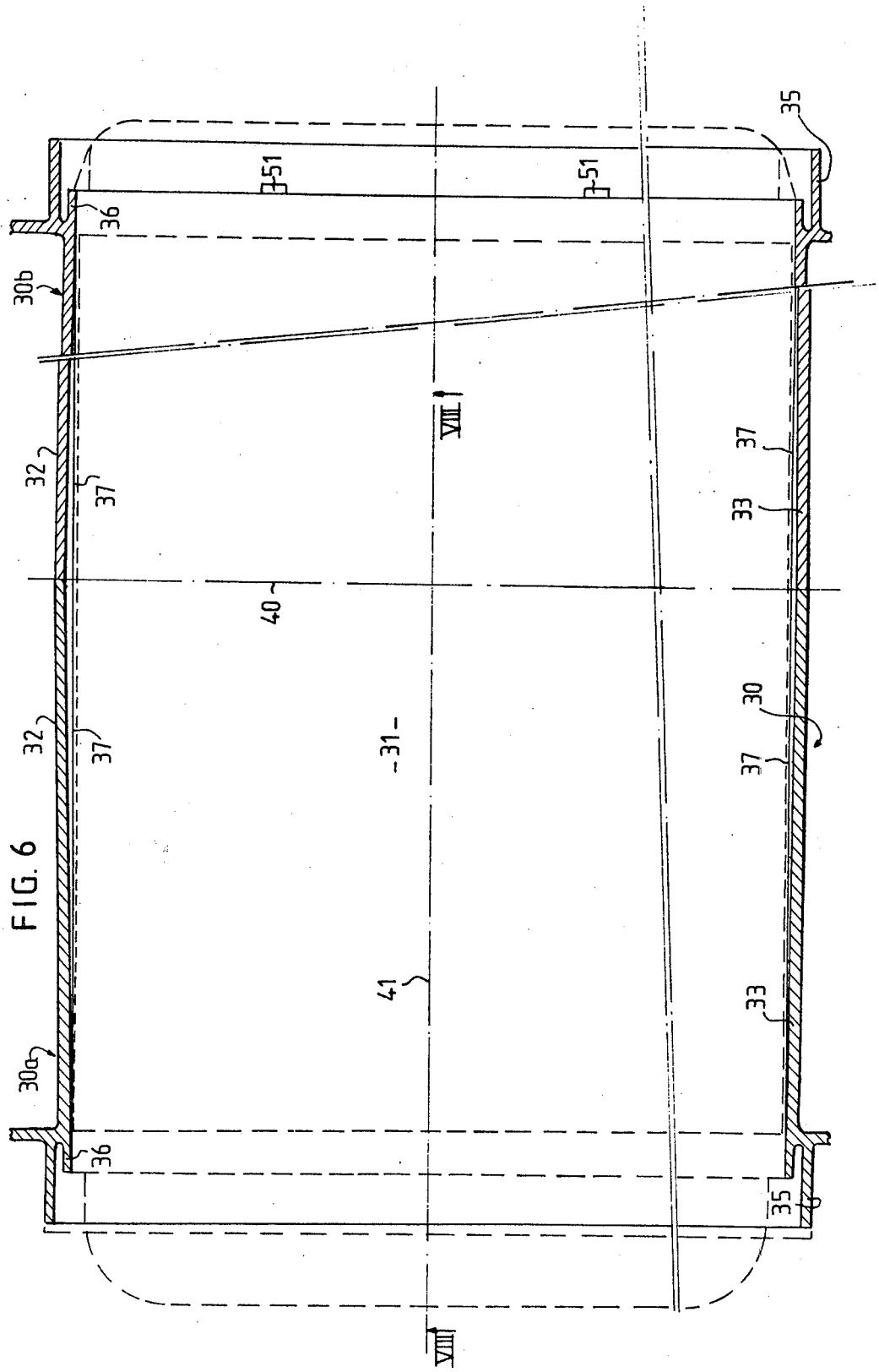

CASE FOR HOUSING A HEAT EXCHANGER, IN PARTICULAR FOR A HEATER INSTALLATION FOR THE PASSENGER SPACE OF A MOTOR VEHICLE

The invention relates to a case for holding a heat exchanger, and particular such a case which forms a part of a heater installation for the passenger space of a motor vehicle.

BACKGROUND OF THE INVENTION

Cases are known which have a cavity that constitutes the housing for a heat exchanger, and into which the heat exchanger is inserted by sliding drawer-like to be fixed therein by any suitable means. The case includes at least one conduit that opens into the cavity to admit air to be heated by passing through the heat exchanger's nest of tubes and then distributed around the passenger space. Sealing strips are applied to the heat exchanger around its end to avoid air leaking out from the open end of the cavity through which it was inserted therein. Sealing strips are similarly applied to either side of the heat exchanger's nest of tubes inside the cavity, particularly in between the smaller longitudinal walls of the heat exchanger and the longitudinal walls of the cavity, in order to prevent the air circulating in said conduit from passing around the nest of tubes rather than through it.

Preferred embodiments of the present invention simplify the assembly of a heat exchanger in such a case, and thereby reduce its cost.

SUMMARY OF THE INVENTION

The present invention provides a case for holding a heat exchanger such as the heater for the passenger space of a motor vehicle, the case comprising a housing suitable for receiving the heat exchanger drawer-like, said case having projections depending therefrom to press against a heat exchanger when received in said case, thereby providing sealing between the heat exchanger and the case.

Thus in accordance with the invention the sealing strips which needed to be added in the prior art are no longer necessary, and it is now sufficient merely to insert the heat exchanger into its case to obtain adequate sealing. This results in much easier assembly and in appreciable cost savings both in parts and in labor.

BRIEF DESCRIPTION OF THE DRAWINGS

In the following description, given by way of example, reference is made to the accompanying drawings, in which:

FIG. 6 is a longitudinal section through a portion of a different embodiment of the case;

MORE DETAILED DESCRIPTION

To begin with reference is made to FIGS. 1 to 5 which show a first embodiment of the invention.

Figure 1:
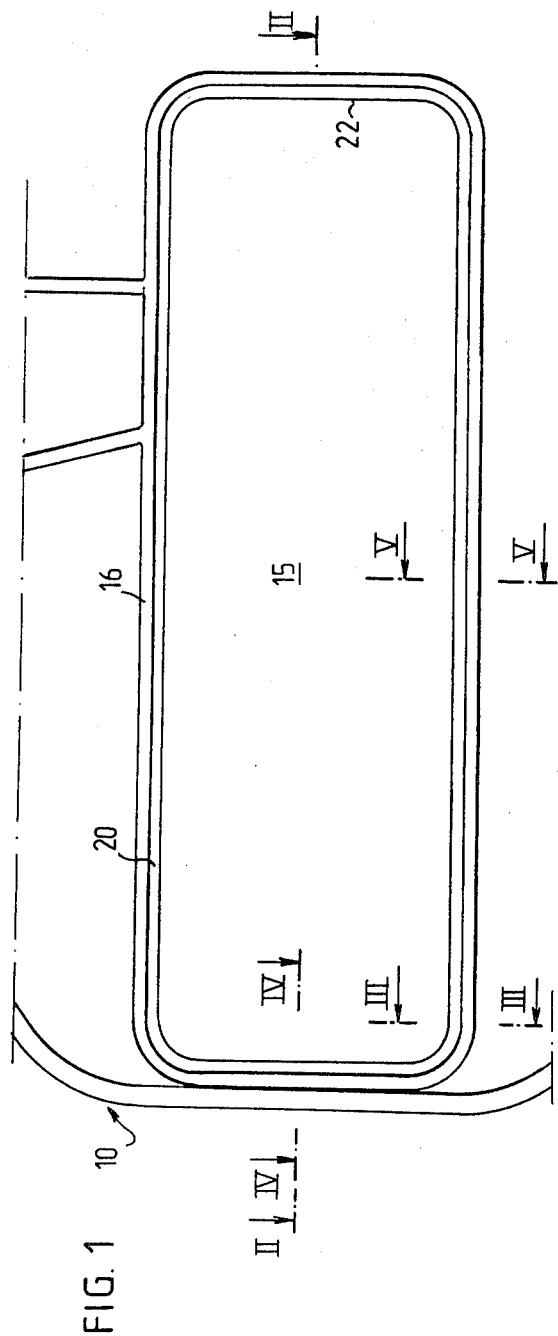
FIG. 1 is a front view of a portion of a case having a housing for a heat exchanger.
Figure 2:
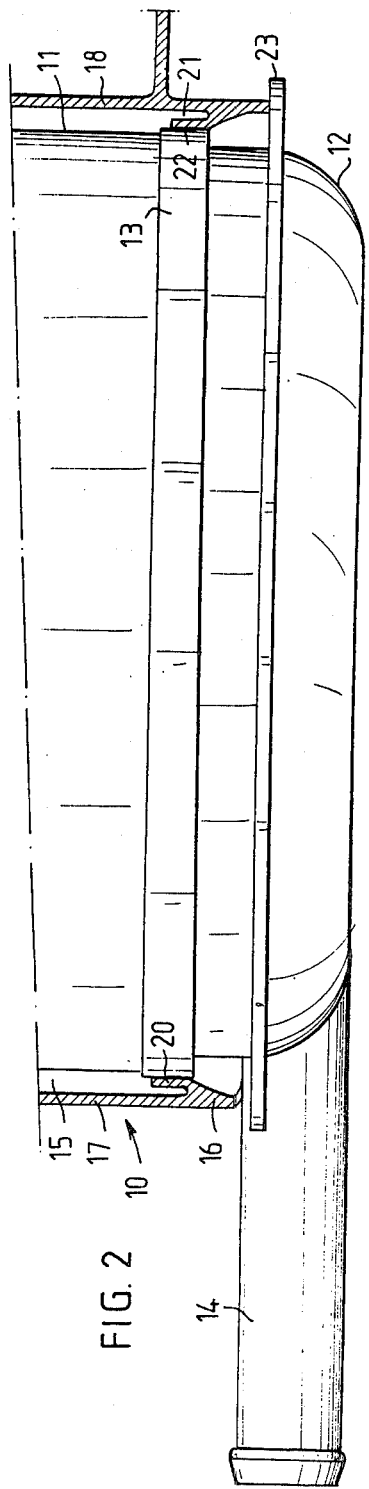
FIG. 2 is a section along a line II—II in FIG. 1, showing the heat exchanger mounted in the case.

FIG. 1 shows a portion 10 of a plastic case which constitutes a part of a heater installation for the passenger space of a motor vehicle. Such a case is suitable for receiving a heat exchanger comprising, for example (see FIG. 2), a nest 11 of finned tubes together with one or two water boxes 12 each mounted at one end of the nest 11 on a tube plate 13 provided at the end of the nest. The nest is connected to a liquid circuit by liquid inlet and outlet tubes which lead either to the same water box, or else to respective ones of the water boxes, as the case may be.

The case 10 in which the heat exchanger is mounted, has a housing 15 which is suitable for receiving said heat exchanger and which opens to the outside of the case 10 via an opening delimited by a continuous rim 16. The periphery of the opening is substantially rectangular with rounded corners and matches the periphery of the water box 12 and/or the tube plate 13 of the heat exchanger.

The housing 15 of the case 10 is delimited by two parallel longitudinal walls 17 and 18 which correspond to the smaller longitudinal faces of the heat exchanger nest of tubes 11. The other two walls of the case 10 delimiting the housing 15 and corresponding to the larger longitudinal faces of the nest 11 are provided with respective openings of substantially the same size as the larger faces of the nest, and are formed by lengths of a conduit for circulating air that is to be injected into the passenger space of the vehicle. The upstream part of such a conduit may include an air blower, while the downstream part may be divided into a plurality of different conduits.

The heat exchanger nest of tubes 11 may be supplied with hot liquid under the control of control means operated by the vehicle driver, and the air circulating in said conduit of the case 10 passes through the heat exchanger nest 11 where it is heated or not depending on whether or not the heat exchanger is supplied with hot liquid.

To avoid loosing air from the case 10, it is necessary to provide peripheral sealing around the heat exchanger at the open end or ends of the housing 15 in order to prevent air from escaping via said open end(s) of the housing 15. It is also necessary to provide sealing along the walls 17 and 18 of the case, between said walls and the smaller longitudinal faces of the heat exchanger nest of tubes 11, in order to prevent the air flowing through the case 10 from passing round the nest 11 without going through it.

In the prior art this sealing has been provided by strips or belts of self adhesive elastically deformable material, for example an expanded plastic or foam material, which strips are mounted around the ends of the heat exchanger nest of tubes 11 and/or around the water boxes, and along the smaller longitudinal faces of the nest or on the walls 17 and 18 of the case. These sealing strips or belts increase the cost of the installation and do not facilitate installing the heat exchanger in its housing in the case.

In accordance with the invention, the required sealing is provided around the heat exchanger by means of projections depending from the body of the case, thereby enabling said prior art sealing strips or belts of elastically deformable material to be done without.

To this end, the open end (or each open end) of the housing 15 has a continuous and elastically deformable peripheral lip 20, constituted by an internal annular peripheral projection depending from the rim 16 when delimits said open end of the housing 15.

The portion 22 of the lip 20 which is intended to press against the outside of the heat exchanger's tube plate 13 has a rounded convex surface and is spaced apart from the wall delimiting the housing 15 by a distance which varies as a function of the position around the periphery of said portion 22 of the lip.

Figure 3:
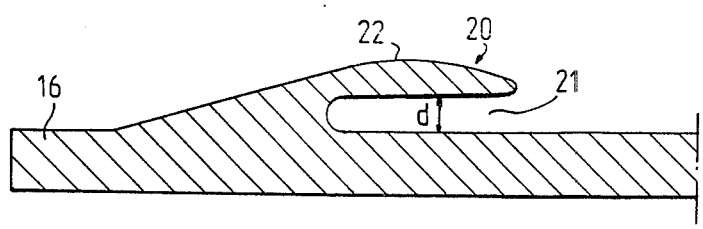
FIGS. 3, 4 and 5 are sections on a larger scale along lines III—III, IV—IV and V—V respectively of FIG. 1.
Figure 4:
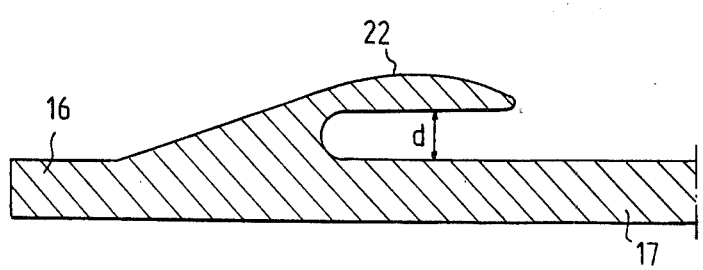
Figure 5:
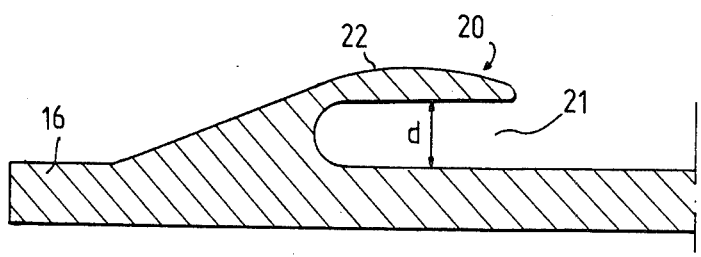

FIGS. 3, 4 and 5 show that this distance d is at a maximum along the larger sides of the tube plate 13, that it is at a minimum at the ends of the larger sides, and that it has an intermediate value along the short sides. These variations in the distance d serve to compensate for variations in the dimensions of the annular lip 20, the tube plate 13 and the case 10.

During assembly, the heat exchanger is inserted into the case 10 via the open end of the housing 15 as though it were a drawer, and it is pushed into the housing until the peripheral rim 23 of the water box 12 abuts against the outer edge 16 of the housing 15. In this position, the convex surface 22 of the sealing lip 20 is pressed around the outside of the tube plate 13 of the heat exchanger, and substantially completely prevents air from escaping that way.

Figure 7:
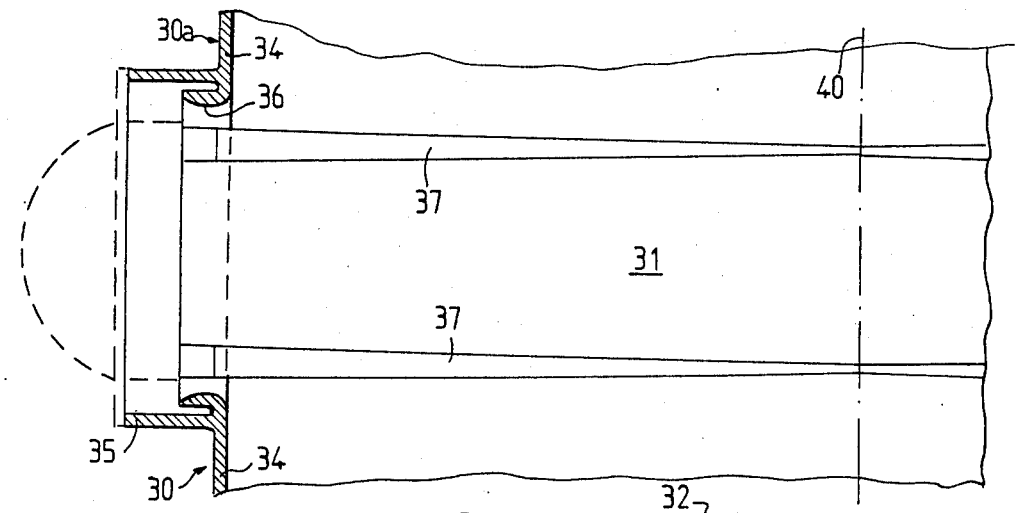
FIG. 7 is a section along a line VII—VII in FIG. 6.
Figure 8:
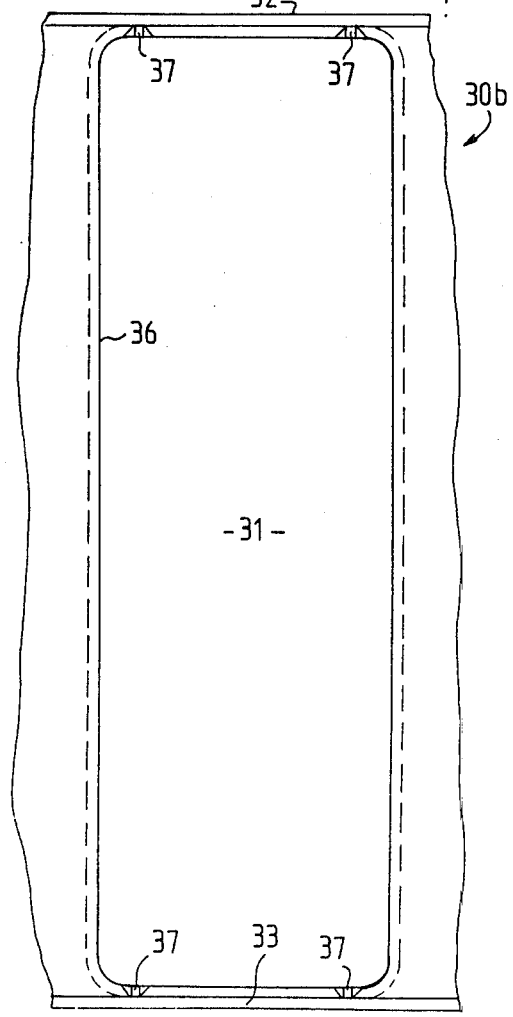
FIG. 8 is a side view of a half-case as shown in FIG. 6.

FIGS. 6 to 8 show means for providing sealing along the smaller longitudinal faces of the nest of tubes to ensure that the air passes through the nest and does not pass round it.

In these figures, the case 30 for receiving the heat exchanger has a housing 31 open to the outside of the case at both ends thereof, and is delimited by two smaller longitudinal walls 32 and 33. The case also includes a conduit delimited by walls 34 and passing transversally through the housing 31.

Each longitudinal open end of the housing 31 is delimited by an annular wall 35 having a periphery which is substantially rectangular with rounded corners, from which periphery there depends an internal peripheral lip 36 running parallel to the wall 35 and directed towards the outside of the case 30 (i.e. in the opposite direction to the annular lip 20 of the embodiment shown in FIGS. 1 to 5).

The convex surface of the sealing lip 36 when pressing against the outside of the heat exchanger's tube plate (shown in dashed lines), prevents the air that is circulating inside the case from escaping via the ends of the housing 31, and likewise prevents outside air from getting into the case that way.

Each of the walls 32 and 33 delimiting the housing 31 has one or more longitudinal ribs 37 extending from one end of the housing 31 to the other suitable for pressing against the smaller longitudinal faces of the heat exchanger nest of tubes, in order to prevent the air circulating inside the case 30 from going round the nest instead of going through it.

In the embodiment shown, the case 30 is made from two parts 30a and 30b which are glued to each other along a joint plane 40 which constitutes the transverse mid plane of the case, and of a heat exchanger that is properly mounted inside the case. Each of the half-cases 30a and 30b is made by moulding, and the walls 32 and 33 of each half-case diverge slightly, ie. they flare slightly going away from their respective ends having the annular lip 36 towards their opposite ends, in order to facilitate un-moulding the walls 32 and 33, and extracting a moulding core therefrom.

Each rib 37 on the walls 32 and 33 stands proud of the wall by an amount which varies smoothly along its length. The ribs 37 are of maximum height at their ends nearest to the joint plane 40 and at a minimum height at their opposite ends adjacent to the peripheral lip 36. This varyig height of the ribs 37 is chosen to compensate the un-mouldng angle of the walls 32 and 33 in such a manner that the lines traced by the tops of the ribs 37 are parallel to the longitudinal axis 41 of the housing 31.

This results in the tops of the ribs 37 being pressed against the smaller longitudinal faces of the heat exchanger nest of tubes over their entire length when the heat exchanger is inserted in its housing 31 in the case 30.

In the embodiment shown, the ribs 37 are of rectangular section at the join plane 40 and then they are trapezoidal, with their height decreasing and their width increasing gradually up to the opposite end of each half-case.

There may be two ribs 37 on each wall 32 and 33, as shown, extendng from the longitudinal edges thereof, or else there may be a greater or a lesser number of ribs.

Figure 9:
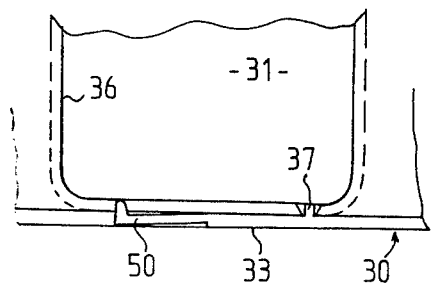
FIG. 9 is a partial view showing a variant of the half-case shown in FIG. 8.

As shown by way of example in FIG. 9, one of the ribs may be replaced with an elastically deformable lug or tongue 50 depending from one of the walls of the housing 31 in the case 30, eg. the wall 33. Said tongue 50 is retractable away from the housing during insertion of the heat exchanger therein, and presses against a smaller longitudinal face of the heat exchanger nest of tubes to hold said nest against vibration and to provide a sealing obstacle preventing air from passing around the nest in said zone.

Stops 51 (FIG. 6) may also be provided depending from the annular wall 35 which delimits the open end of the case 30 at the end opposite to the end through which the heat exchanger is inserted into the case. The stops 51 are suitable for abutting against the corresponding water box 52 of the heat exchanger and for holding it against vibration, in order to protect the flexible lips 36. The stops 51 may be moulded at the same time as the annular wall 35 if possible, or otherwise they may be added thereto.

Figure 10:
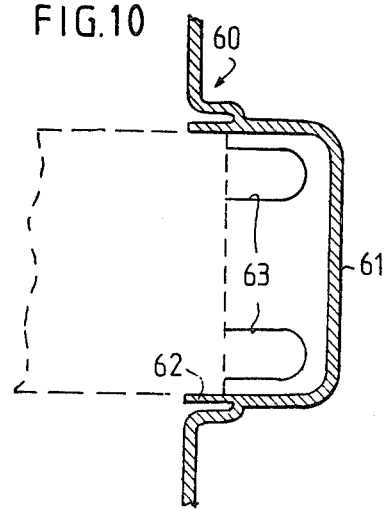
FIG. 10 is a partial section through another embodiment of the invention.

When the heat exchanger has only a single water box (FIG. 10), the housing 60 may be provided with a dished end 61 at its end opposite to the end through which the heat exchanger is inserted. The wall of said dished end 61 is extended towards the inside of the case by an annular edge 62 which constitutes the elastically deformable lip for pressing against the heat exchanger nest of tubes. The dish shaped end 61 is deep enough to leave room for the U-shaped ends of the heat exchanger tubes.

In a variant, the elastically deformable sealing lip may press against the water box instead of against the tube plate.

I claim:

1. A molded, hollow case for a heat exchanger comprising a housing configured to support a heat exchanger therewithin in spaced nested relationship, combination support and sealing means integrally formed in the interior of said housing and including an inner peripheral portion positioned at at least one end of said housing configured to define an elastically deformable lip dimensioned to sealingly engage said heat exchanger when said heat exchanger is positioned within said housing and preclude undesired air leakage between said housing and said heat exchanger.

2. A case according to claim 1, wherein said lip cooperates with said heat exchanger via a portion of lip which has a convex surface.

3. A case according to claim 1, wherein said housing is shaped to receive a heat exchanger having a body or nest of tubes that is substantially in the shape of a rectangular parallelipiped having smaller and larger longitudinal rectangular faces, said housing having at least two substantially plane walls corresponding to the smaller longitudinal rectangular faces of the body or nest of the heat exchanger, with ribs projecting therefrom to provide sealing between said walls and said smaller longitudinal rectangular faces of the body or nest of the heat exchanger.

4. A case according to claim 3, wherein said ribs are formed adjacent to the longitudinal edges of said plane walls of the housing.

5. A case according to claim 3, wherein said ribs are of a cross section having a shape chosen from the group comprising rectangular, triangular and trapezoidal.

6. A case according to claim 3, wherein the case is made by moulding and has a slight flare to facilitate mold core removal, and wherein each rib tapers smoothly in height from one end to the other in such a manner as to compensate for said core removal facilitating flare.

7. A case according to claim 6, wherein each rib gets smoothly taller going away from its end adjacent which the heat exchanger is inserted into the case.

8. A case according to claim 1, wherein the open end of the housing has an annular edge for engaging a rim or a peripheral projection of the water box of the heat exchanger.

9. A case according to claim 8, wherein the opposite end of the housing has a moulded dish shaped water box suitable for receiving a water box free end of a heat exchanger nest of tubes.

10. A case according to claim 1, wherein at least one of the longitudinal walls of the housing is moulded with an elastically deformable lug or tongue suitable for pressing against the nest of tubes of the heat exchanger.

11. A case according to claim 10, wherein the lug or tongue is resiliently retractable away from the housing while the heat exchanger is being inserted therein.

12. A case according to claim 1, wherein the case is further provided with projecting fingers or stops for holding one end of the heat exchanger against vibration.

* * * * *